US012729833B1

(12) United States Patent
Xiao

(10) Patent No.: US 12,729,833 B1
(45) Date of Patent: Sep. 8, 2026

(54) OPTICAL ASSEMBLY WITH SWING-ADJUSTABLE LENS AND LIGHTING FIXTURE INCORPORATING THE SAME

(71) Applicants: NEKO Lighting AG, Zurich (CH); E-LITE LIGHTING CO., LTD., Shenzhen (CN)

(72) Inventor: Miancan Xiao, Shenzhen (CN)

(73) Assignees: NKEO Lighting AG, Zurich (CH); E-LITE LIGHTING CO., LTD., Shenzhen (CN)

( * ) Notice: Subject to any disclaimer, the term of this patent is extended or adjusted under 35 U.S.C. 154(b) by 0 days.

(21) Appl. No.: 19/224,935

(22) Filed: Jun. 2, 2025

(51) Int. Cl.

| | |
|---|---|
| ***F21V 14/06*** | (2006.01) |
| ***F21V 13/04*** | (2006.01) |
| ***F21V 15/01*** | (2006.01) |
| ***F21V 17/12*** | (2006.01) |
| ***F21V 17/16*** | (2006.01) |
| ***F21V 23/00*** | (2015.01) |
| ***F21V 23/02*** | (2006.01) |
| ***F21V 29/78*** | (2015.01) |
| ***F21Y 115/10*** | (2016.01) |

(52) U.S. Cl.
CPC .............. *F21V 14/06* (2013.01); *F21V 13/04* (2013.01); *F21V 15/01* (2013.01); *F21V 17/12* (2013.01); *F21V 17/164* (2013.01); *F21V 23/001* (2013.01); *F21V 23/02* (2013.01); *F21V 29/78* (2015.01); *F21Y 2115/10* (2016.08)

(58) Field of Classification Search
CPC .......... F21V 14/06; F21V 29/78; F21V 13/04; F21V 15/01; F21V 17/12; F21V 17/164; F21V 23/001; F21V 23/02
See application file for complete search history.

(56) References Cited

U.S. PATENT DOCUMENTS

| | | | | |
|---|---|---|---|---|
| 10,512,247 | B2 * | 12/2019 | Ormsbee | F21V 23/0492 |
| 10,683,995 | B1 * | 6/2020 | Hashimoto | F21V 17/16 |
| 10,857,428 | B2 * | 12/2020 | Lin | A63B 37/06 |
| 11,559,725 | B1 * | 1/2023 | Ayal | A63B 43/06 |
| D1,051,460 | S * | 11/2024 | Cadisch | D26/63 |
| 12,330,084 | B2 * | 6/2025 | Kelly | A63H 13/005 |
| 12,398,837 | B2 * | 8/2025 | Zhou | B63G 8/04 |
| 2015/0159846 | A1 * | 6/2015 | Hollinger | G03B 15/03 362/183 |

(Continued)

*Primary Examiner* — Bryon T Gyllstrom
(74) *Attorney, Agent, or Firm* — Jose Cherson Weissbrot

(57) ABSTRACT

An optical assembly with a swing-adjustable lens and a lighting fixture incorporating the same; optical assembly comprises a spherical cage base, lens support, optical lens, and LED light source; spherical cage cavity is formed in the spherical cage base, and LED light source is fixedly arranged in the spherical cage cavity; the lens support is provided with hollow spherical head housing, the optical lens is arranged in an inner cavity of the spherical head housing, and a light outlet of the optical lens is fixedly connected to the lens support; the structure is reasonable; the LED light source is fixedly arranged, and the spherical head housing is rotatable in the spherical cage base, thereby propelling the optical lens to swing relative to the light source such that the light-emitting direction is adjusted; the adjustment process interferes with fewer components, achieving compact structure and high flexibility.

8 Claims, 6 Drawing Sheets

(56) References Cited

U.S. PATENT DOCUMENTS

| | | | | |
|---|---|---|---|---|
| 2015/0159853 | A1* | 6/2015 | Maxik | F21V 29/65<br>362/373 |
| 2020/0003398 | A1* | 1/2020 | Cadisch | F21V 5/04 |
| 2020/0132278 | A1* | 4/2020 | Portinga | F21V 15/01 |
| 2020/0326064 | A1* | 10/2020 | Cadisch | F21V 29/773 |

* cited by examiner

OPTICAL ASSEMBLY WITH SWING-ADJUSTABLE LENS AND LIGHTING FIXTURE INCORPORATING THE SAME

TECHNICAL FIELD

This invention generally relates to the technical field of lighting fixtures, and more particularly, to an optical assembly with a swing-adjustable lens and a lighting fixture incorporating the same.

BACKGROUND

A lighting fixture normally includes a trim, a reflector, a lens assembly, an LED light source, a heat sink and a light body, wherein the reflector, the lens assembly, the LED light source and the heat sink are sequentially installed in the light body. To adjust the light-emitting direction, the lighting fixture body structure can be rotatably installed on the installation surface, such as traditional wall mounted light and surface mounted light. For a down light or underground light, the trim cannot rotate because it is recessed in the ceiling or under the ground. To solve the aforesaid problem, the reflector, the lens assembly, the LED light source and the heat sink are assembled together and are rotatably connected to the light body or a support through a rotating mechanism, thereby allowing the light-emitting direction of the lighting fixture to be adjusted.

Chinese patent CN205782707U discloses a lighting fixture angle adjustment mechanism, which comprises a base and an angle adjustment apparatus for supporting the lighting fixture. The angle adjustment apparatus comprises at least a pair of supports, and the support includes a lower support frame connected to the base and an upper support frame connected to the lighting fixture. The lower support frame is movably connected to the upper support frame, and the upper support frame is capable of rotating relative to the lower support frame. One of the upper support frames is connected to a positioning mechanism for positioning the upper support frame. According to the above technical solution, the lighting fixture is fixed on the upper support frame of the support, and the light-emitting deflection angle of the lighting fixture is adjusted through the relative rotation between the upper support frame and the lower support frame.

Under such circumstances, when adjusting the light-emitting deflection angle of the lighting fixture, the lighting fixture needs to rotate along with the angle adjustment apparatus, resulting in complex structure and poor flexibility. Therefore, the prior art needs to be improved.

SUMMARY

The purpose of the present invention is to provide an optical assembly with a swing-adjustable lens, which has a compact structure and is capable of being flexibly adjusted.

To achieve the above purpose, the present invention adopts the following technical solution: an optical assembly with a swing-adjustable lens comprises a spherical cage base, a lens support, an optical lens, and an LED light source; a spherical cage cavity is formed in the spherical cage base, and the LED light source is fixedly arranged in the spherical cage cavity; the lens support is provided with a hollow spherical head housing, the optical lens is arranged in an inner cavity of the spherical head housing, and a light outlet of the optical lens is fixedly connected to the lens support; the spherical head housing is rotatably arranged in the spherical cage cavity, so that the light inlet of the optical lens and the LED light source are arranged in a paired manner.

In another preferred embodiment, the spherical cage base comprises a hollow cage body and a cage cover, the cage body is connected to the cage cover in a paired manner. The projection of an inner side wall of the cage body and an inner side wall of the cage cover on the vertical cross section form a minor arc. The minor arc rotates around the vertical central axis of the spherical cage base to form a spherical cage cavity, and the spherical head housing is rotatably arranged in the spherical cage cavity between the cage body and the cage cover.

In another preferred embodiment, the cage cover is provided with a rotary snap ring, and the rotary snap ring is connected to the cage body in an interacting manner to assemble the spherical head housing in the spherical cage cavity.

In another preferred embodiment, a plurality of anti-sliding ribs are arranged in the spherical cage cavity. The plurality of anti-sliding ribs are arranged on an inner side wall of the cage body and an inner side wall of the cage cover at equal intervals around the vertical central axis of the spherical cage base. The plurality of anti-sliding ribs abut against an outer side wall of the spherical head housing.

In another preferred embodiment, the cage body is provided with a base plate. The base plate is provided with a plurality of insertion notches and stop blocks for interacting with the insertion notches.

In another preferred embodiment, a limiting ring is arranged in a lower opening of the lens support, a skirt ring is arranged at a light outlet of the optical lens, a plurality of limiting fasteners are arranged on a side wall of the lens support, and the limiting fastener interacts with the limiting ring to fasten and connect the skirt ring.

In another preferred embodiment, a light-emitting central axis of the LED light source overlaps a vertical central axis of the spherical cage base. A rotation center point A of the spherical head housing is on the vertical central axis of the spherical cage base.

A lighting fixture comprises a heat sink and the optical assembly with a swing-adjustable lens. An island unit is arranged in the heat sink, and the spherical cage base is fixedly arranged in the heat sink. A lower end of the island unit penetrates through the spherical cage base and is arranged in the spherical cage cavity, and the LED light source is fixed on a lower end surface of the island unit. The heat sink is provided with a power supply module, and the power supply module is connected to the LED light source through wires.

In another preferred embodiment, an inner side wall of the heat sink is provided with a plurality of guide plates, the guide plates are provided with sliding fastening notches, and the base plate is arranged in the sliding fastening notches in an inserting manner, thereby allowing the spherical cage base to be fixed in the heat sink.

In another preferred embodiment, the present invention further comprises a reflector, and the guide plate is provided with a limiting notch. An upper end of the reflector is provided with a plurality of insertion pieces, and the plurality of insertion pieces are inserted into corresponding limiting notches, so that the reflector is fixedly arranged in the lower opening of the heat sink.

Compared with the prior art, the present invention has the following advantages: the structure is reasonable; the LED light source is fixedly arranged, and the spherical head housing is rotatably arranged in the spherical cage base, thereby propelling the optical lens to swing relative to the light source such that the light-emitting direction is adjusted; the adjustment process interferes with fewer components, achieving a compact structure and high flexibility.

In Figures: 1—Spherical Cage Base, 2—Lens Support, 3—Optical Lens, 4—LED Light Source, 5—Hanger Bar A, 11—Spherical Cage Cavity, 12—Cage Body, 13—Cage Cover, 14—Base Plate, 110—Anti-sliding Rib, 130—Rotary Snap Ring, 140—Insertion Notch, 141—Stop Block, 21—Spherical Head Housing, 22—Limiting Ring, 23—Limiting Fastener, 31—Skirt Ring, 41—Heat Sink, 42—Island Unit, 43—Power Supply Module, 44—Reflector, 45—Insertion Piece, 410—Guide Plate, 411—Sliding Fastening Notch, 412—Limiting Notch, 51—Hanger Bar B, 52—Fixture Housing.

DETAILED DESCRIPTION

Drawings and embodiments are combined hereinafter to further elaborate the technical solution of the present invention.

Figure 1:
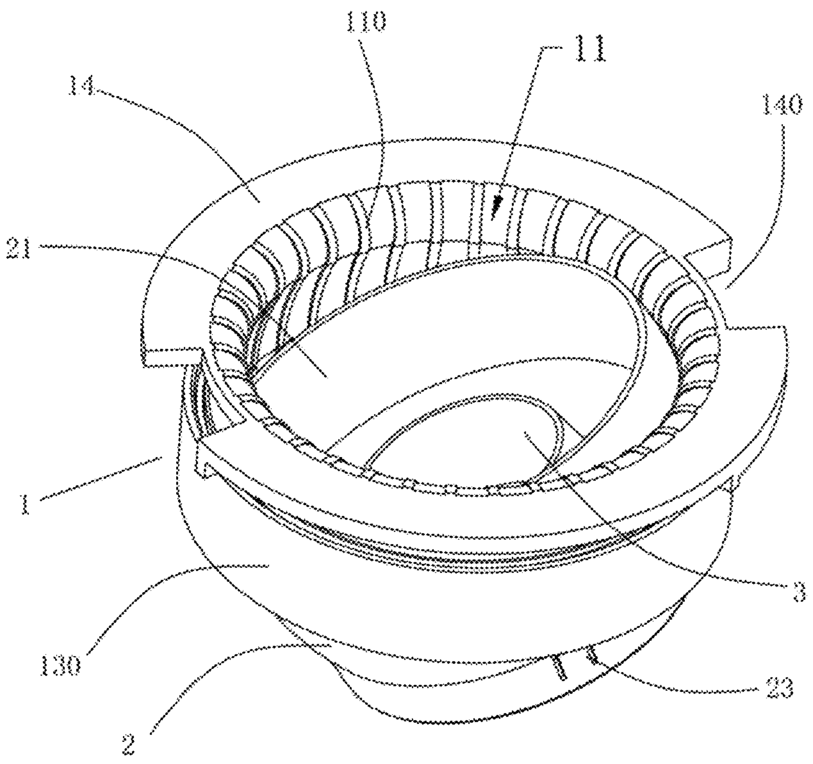
FIG. 1 is a schematic diagram illustrating an exemplary structure of the optical assembly of the present invention.
Figure 2:
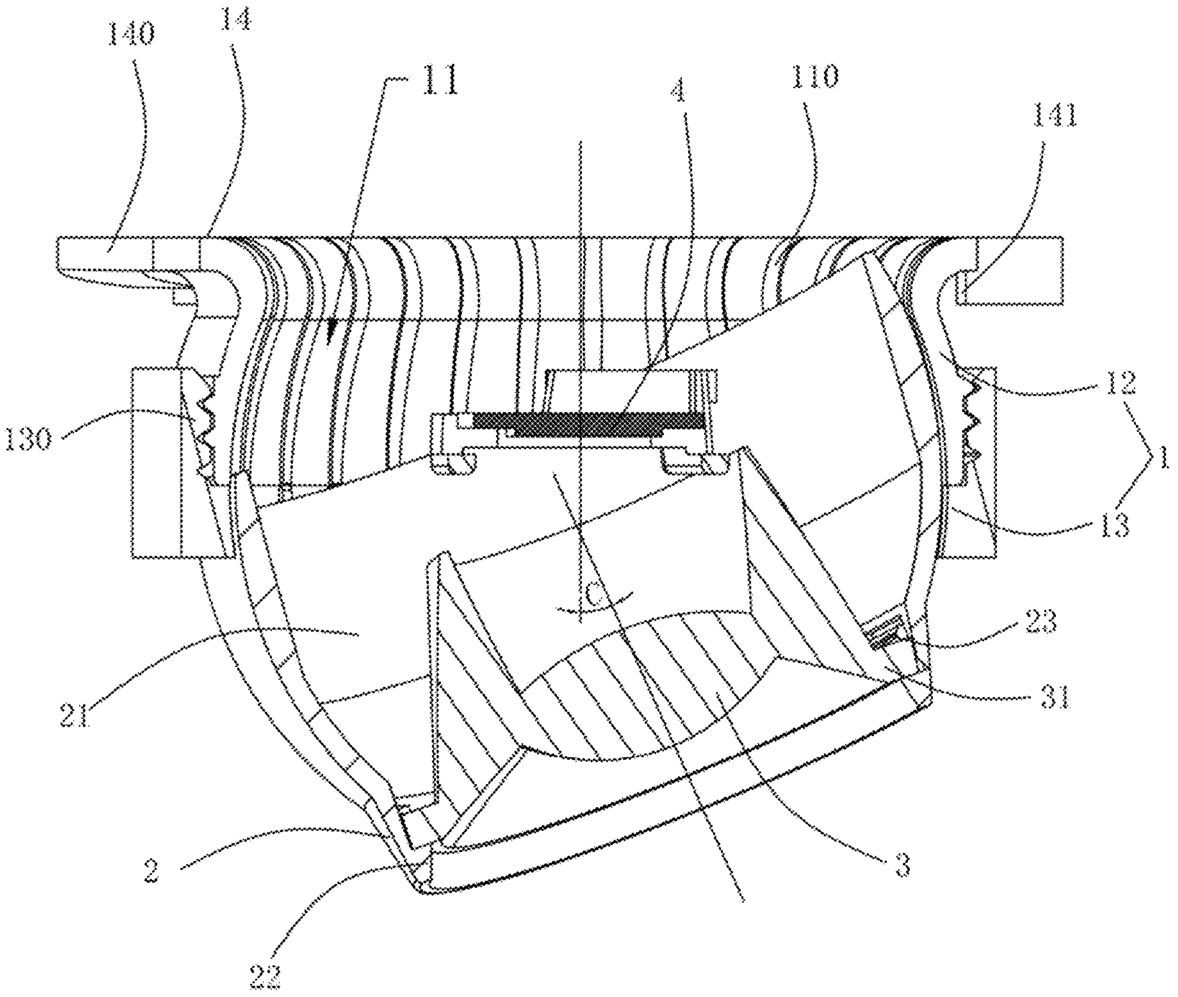
FIG. 2 is a schematic diagram illustrating a sectional view of the optical assembly of the present invention.
Figure 3:
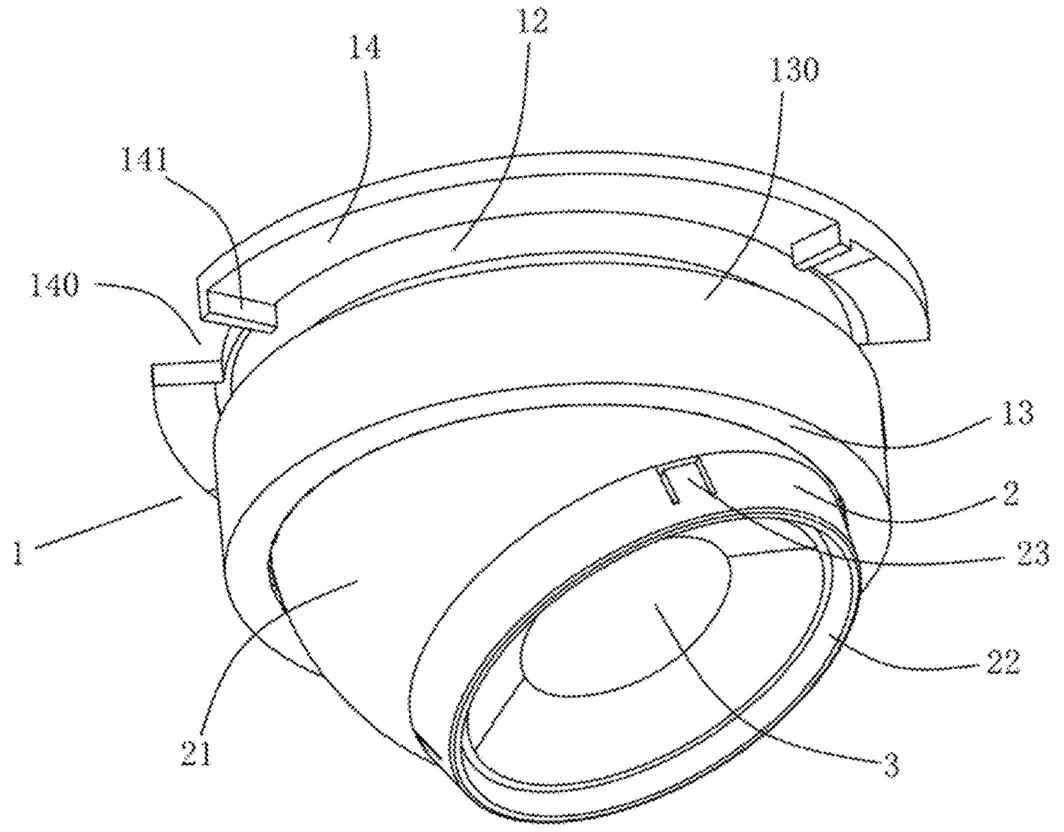
FIG. 3 is a schematic diagram illustrating an exemplary structure in FIG. 1 in another viewing angle.

Referring to FIGS. 1-3, the optical assembly with a swing-adjustable lens comprises a spherical cage base 1, a lens support 2, an optical lens 3, and an LED (light-emitting diode) light source 4. A spherical cage cavity 11 is formed in the spherical cage base 1, and the LED light source 4 is fixedly arranged in the spherical cage cavity 11. The lens support 2 is provided with a hollow spherical head housing 21, the optical lens 3 is arranged in an inner cavity of the spherical head housing 21, and a light outlet of the optical lens 3 is fixedly connected to the lens support 2. The spherical head housing 21 is rotatably arranged in the spherical cage cavity 11, so that the light inlet of the optical lens 3 and the LED light source 4 are arranged in a paired manner.

It is worth mentioning that, the spherical head housing 21 and the spherical cage cavity 11 are paired with each other to form a universal joint structure, and the spherical head housing 21 is capable of rotating in the spherical cage cavity 11 to propel the optical lens 3 to swing relative to the LED light source 4.

Referring to FIG. 2, based on the principle of optical refraction, an included angle C is formed between the light-receiving port of the optical lens 3 and the light-emitting axis of the LED light source 4. In this way, the projection direction of the LED light source 4 may be changed, thereby realizing the adjustment of the illumination angle. During the adjustment, there are fewer components interfering with each other, and only the spherical head housing 21 and the optical lens 3 rotate, achieving more flexible and convenient adjustment.

Further, the LED light source 4 is installed on a heat sink 41, and in the adjustment process, the LED light source 4 is fixed, and the heat sink 41 may also be fixed. Thus, the heat dissipation effect of the LED light source 4 is significantly improved.

The spherical cage base 1 comprises a hollow cage body 12 and a cage cover 13, the cage body 12 is connected to the cage cover 13 in a paired manner. The projection of an inner side wall of the cage body 12 and an inner side wall of the cage cover 13 on the vertical cross section form a minor arc. The minor arc rotates around the vertical central axis of the spherical cage base 1 to form a spherical cage cavity 11, and the spherical head housing 21 is rotatably arranged in the spherical cage cavity 11 between the cage body 12 and the cage cover 13. The central angle of the minor arc is lower than 120°, thereby forming the spherical cage cavity 11. An upper end and a lower end of the spherical cage base 1 are both configured to be open. Namely, the spherical cage cavity 11 penetrates through the upper end surface and the lower end surface of the spherical cage base 1 in the vertical direction.

The inner diameter of a lower opening of the cage cover 13 is smaller than the diameter of the spherical head housing 21, so that the spherical head housing 21 does not fall off after being assembled in the spherical cage cavity 11. The cage body 12 and the cage cover 13 are separately arranged, thereby allowing the spherical head housing 21 to be conveniently assembled in the spherical cage cavity 11.

It is worth mentioning that the lens support 2 is arranged below the spherical cage base 1 and interacts with the spherical cage cavity 11 through the spherical head housing 21. In this way, the lens support 2 is rotatably connected to the spherical cage base 1, thereby enabling the optical lens 3 to rotate relative to the LED light source 4.

Normally, the LED light source 4 adopts the wide-angle light emitting (the light emitting angle is greater than) 120°. The LED light source 4 is fixedly arranged in the spherical cage cavity 11, so that the light-emitting central axis of the LED light source 4 is parallel to the vertical direction. Moreover, by limiting the distance between the LED light source 4 and the light inlet of the optical lens 3, the light-emitting efficiency of the LED light source 4 is ensured.

There is no connection relationship between the LED light source 4 and the spherical cage base 1, and the LED light source 4 is fixedly arranged on the heat sink 41. The optical lens 3 is propelled to rotate in the spherical cage cavity 11 only through the spherical head housing 21, and a non-zero included angle is formed between the light-emitting central axis of the optical lens 3 and the light-emitting central axis of the LED light source 4, so that the projection angle of the optical lens 3 varies.

The cage cover 13 is provided with a rotary snap ring 130, and the rotary snap ring 130 is connected to the cage body 12 in an interacting manner to assemble the spherical head housing 21 in the spherical cage cavity 11. As described above, the cage body 12 and the cage cover 13 are arranged separately, so that the spherical head housing 21 is installed conveniently. The rotary snap ring 130 is sleeved on an outer side of the cage body 12, and the rotary snap ring 130 is assembled and connected to the cage body 12 through a connecting structure. The connecting structure includes but is not limited to a conventional threaded connection, snap connection and ultrasonic welding.

Preferably, the cage body 12, the cage cover 13 and the rotary snap ring 130 are made of plastic. The rotary snap ring 130 and the cage body 12 are in threaded connection.

Further, a plurality of anti-sliding ribs 110 are arranged in the spherical cage cavity 11. The plurality of anti-sliding ribs 110 are arranged on an inner side wall of the cage body 12 and an inner side wall of the cage cover 13 at equal intervals around the vertical central axis of the spherical cage base 1. The plurality of anti-sliding ribs 110 abut against an outer side wall of the spherical head housing 21. After the cage cover 13 and the cage body 12 are fixedly connected, the spherical cage cavity 11 is formed, and the spherical head housing 21 is assembled in the spherical cage cavity 11. Thus, the spherical head housing 21 is capable of rotating in the spherical cage cavity 11. It is worth mentioning that the spherical head housing 21 and the spherical cage cavity 11 are kept stable through a static friction force, and the cage cover 13 and the cage body 12 are tightened through a rotary snap ring 130, so that the static friction force between the spherical cage cavity 11 and the spherical head housing 21 is increased. To avoid poor flexibility caused by locking between the spherical head housing 21 and the spherical cage cavity 11, a plurality of anti-sliding ribs 110 are arranged between the spherical head housing 21 and the spherical cage cavity 11, so that the rotation of the spherical head housing 21 in the spherical cage cavity 11 becomes more flexible when the angle is stable.

Further, the optical assembly of the present invention is applied to a lighting fixture. The cage body 12 is provided with a base plate 14, and the base plate 14 is used for mounting the spherical cage base 1 on the heat sink 41 of the lighting fixture. More specifically, the base plate 14 is provided with a plurality of insertion notches 140 and stop blocks 141 for interacting with the insertion notches 140. An inner side wall of the heat sink 41 is provided with a plurality of guide plates 410, the guide plates 410 are provided with sliding fastening notches 411, and the base plate 14 is inserted into the sliding fastening notches 411. Thus, the spherical cage base 1 is fixed in the heat sink 41. During assembly, after the optical assembly is assembled, it is installed from the lower portion of the heat sink 41.

The outer diameter of the base plate 14 matches the inner diameter of the heat sink 41. By means of the interaction between the insertion notch and the guide plate 410, the base plate 14 and the spherical cage base 1 are installed in the heat sink 41. After the optical assembly is integrally installed in place, the base plate 14 reaches the sliding fastening notch 411 in the guide plate 410, and the spherical cage base 1 rotates by a certain angle, thereby allowing the base plate 14 to be fastened with the sliding fastening notch 411. In this way, the optical assembly and the heat sink 41 are assembled without using screws.

Preferably, in the assembly process of the optical assembly, after the spherical cage base 1 rotates by a certain angle, the stop block 141 on the base plate 14 abuts against the guide plate 410 such that the assembly is facilitated. Further, the thickness of the base plate 14 may vary. Namely, the thickness of the base plate 14 at the position where the insertion notch 140 is located is the smallest, and the thickness of the base plate 14 at the position where the stop block 141 is located is the largest. When the base plate 14 is inserted into the insertion notch 140 and rotates by a certain angle to make the stop block 141 abut against the guide plate 410, the engagement between the base plate 14 and the insertion notch 140 is tight, thereby effectively preventing the optical assembly from loosening.

A limiting ring 22 is arranged in a lower opening of the lens support 2, a skirt ring 31 is arranged at a light outlet of the optical lens 3, a plurality of limiting fasteners 23 are arranged on a side wall of the lens support 2, and the limiting fastener 23 interacts with the limiting ring 22 to fasten and connect the skirt ring 31. It is worth mentioning that, the limiting fastener 23 is an elastic fastener, and when the optical lens 3 is installed into the lens support 2, the skirt ring 31 on the optical lens 3 passes through the plurality of limiting fasteners 23 to abut against the limiting ring 22. Further, the plurality of limiting fasteners 23 are reset to bounce out for interacting with the limiting ring 22 to fasten and connect the skirt ring 31, so that the optical lens 3 is fixedly arranged in the lens support 2.

Figure 4:
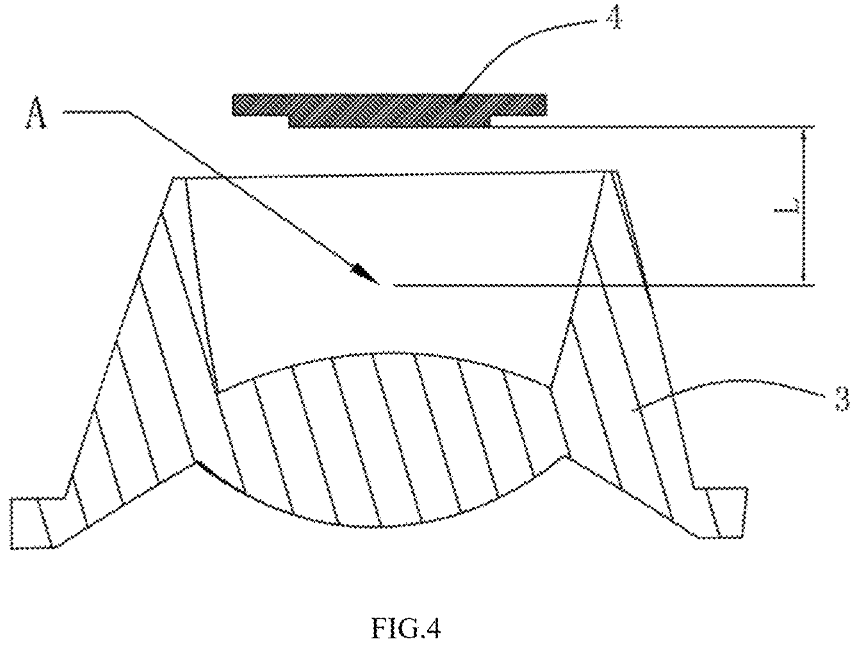
FIG. 4 is a schematic diagram illustrating the swing-angle-adjustment principle of the optical lens of the present invention.

Referring to FIG. 4, a light-emitting central axis of the LED light source 4 overlaps a vertical central axis of the spherical cage base 1. A rotation center point A of the spherical head housing 21 is on the vertical central axis of the spherical cage base 1. A distance between the rotation center point A and the LED light source 4 is defined as L, and the value of L ranges from 2-6.7 mm (Lens focal length). The rotation center point A of the spherical head housing 21 is the same as a swing center point of the optical lens 3, and the distance L between the rotation center point A and the LED light source 4 is related to the light-emitting efficiency of the optical lens 3. More specifically, the smaller the value of L, the closer the rotation center point A of the optical lens 3 is to the LED light source 4. In this way, the light-emitting efficiency of the optical lens 3 is lower during the rotation process, and correspondingly, the swing space required by the optical lens 3 is smaller. Contrarily, the larger the value of L, the farther the rotation center point A of the optical lens 3 is away from the LED light source 4. Thus, the light-emitting efficiency of the optical lens 3 is higher during the rotation process, and correspondingly, the swing space required by the optical lens 3 is larger.

In other words, the smaller the value of L, the worse effect of light spot projected by the optical lens 3 during the swing process. When the value of L is larger, the effect of the light spot projected by the optical lens 3 in the swing process becomes better.

Figure 5:
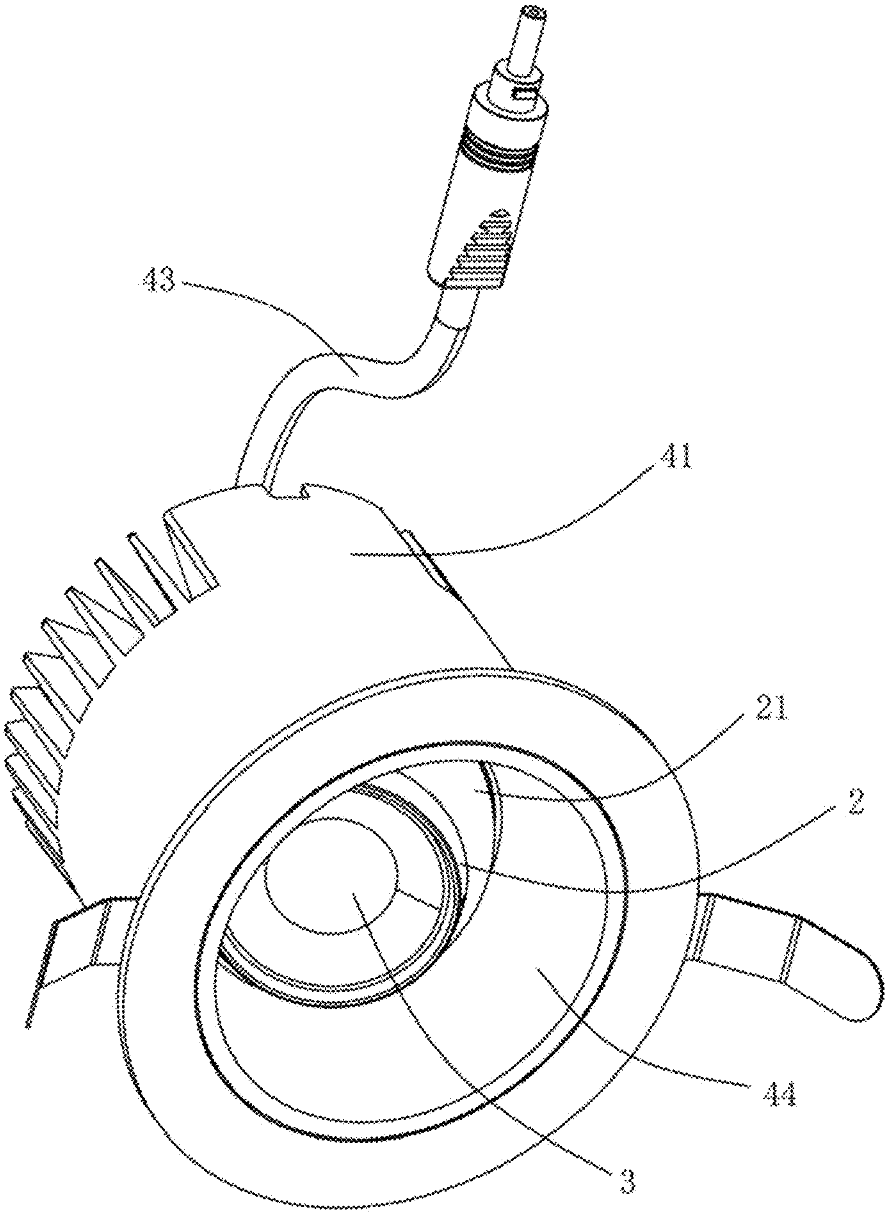
FIG. 5 is a schematic diagram illustrating an exemplary structure of the lighting fixture of the present invention.
Figure 6:
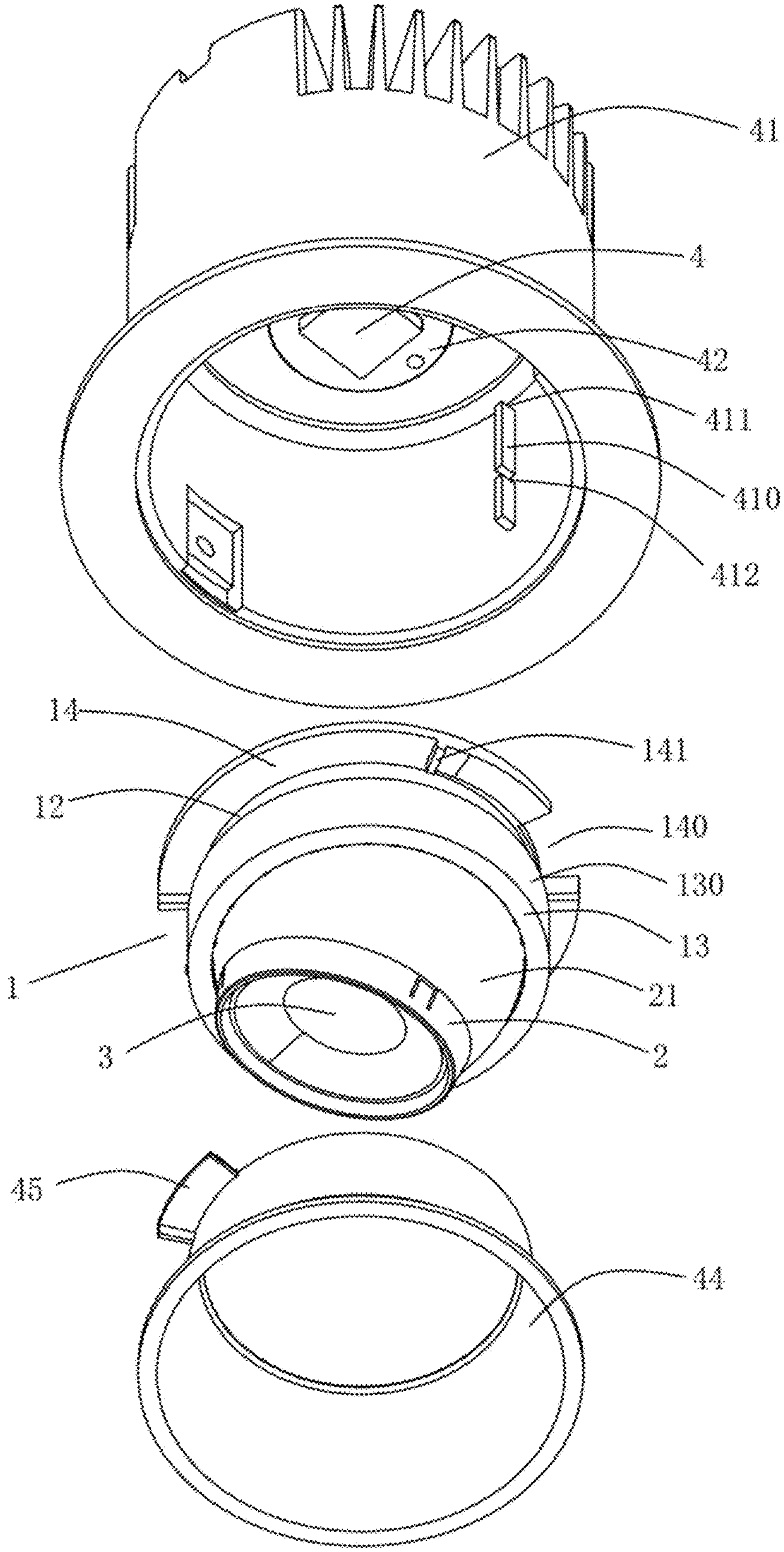
FIG. 6 is a schematic diagram illustrating an exemplary structure before the optical assembly and the heat sink are assembled.

Referring to FIGS. 5-6, the lighting fixture comprises a heat sink 41 and an optical assembly with a swing-adjustable lens. An island unit 42 is arranged in the heat sink 41, and the spherical cage base 1 is fixedly arranged in the heat sink. A lower end of the island unit 42 penetrates through the spherical cage base 1 and is arranged in the spherical cage cavity 11, and the LED light source 4 is fixed on a lower end surface of the island unit 42. The heat sink 41 is provided with a power supply module 43, and the power supply module 43 is connected to the LED light source 4 through wires. The optical assembly is installed in an inner cavity of the heat sink 41, an upper end of the spherical cage base 1 is close to an inner wall of an upper end of the heat sink 41, and an outer diameter of the base plate 14 matches an inner diameter of the heat sink 41. The insertion notch 140 interacts with the guide plate 410 in a paired manner, thereby enabling the base plate 14 and the spherical cage base 1 to be installed into the heat sink 41. At this point, the island unit 42 extends into the spherical cage cavity 11, making the LED light source 4 close to the rotation center point A of the spherical head housing 21 such that the light-emitting efficiency is improved.

Figure 7:
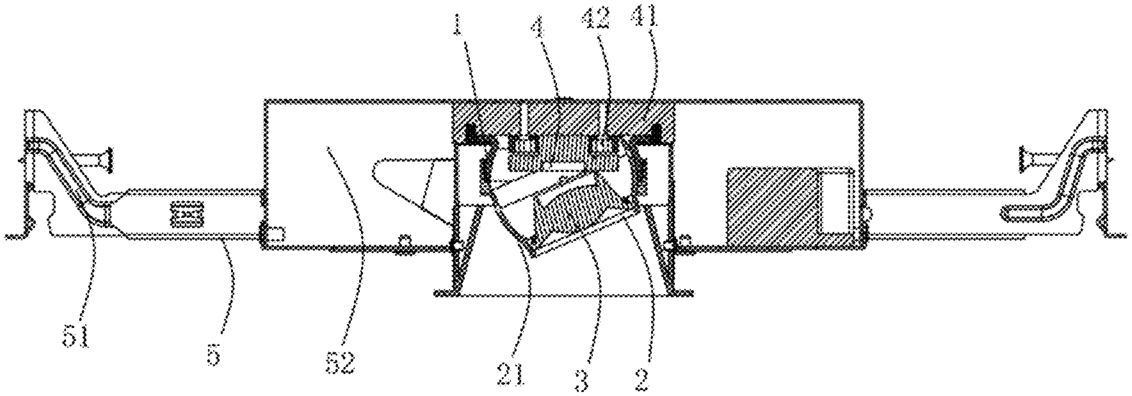
FIG. 7 is a schematic diagram illustrating an exemplary structure when the optical assembly of the present invention is used in the box-type lighting fixture.

The present invention further comprises a reflector 44, and the guide plate 410 is provided with a limiting notch 412. An upper end of the reflector 44 is provided with a plurality of insertion pieces 45, and the plurality of insertion pieces 45 are inserted into corresponding limiting notches 412. In this way, the reflector 44 is fixedly arranged in the lower opening of the heat sink 41. The reflector 44 achieves a light condensing effect such that the light-emitting efficiency of the optical assembly is further improved. The assembly method of the reflector 44 is the same as that of the spherical cage base 1 and is therefore briefly described herein. The aforesaid optical assembly may also be used in a box-type lighting fixture. Referring to FIG. 7, the lighting fixture further comprises a hanger bar A 5, and banger bars B 51 are arranged on two side edges of the hanger bar A 5. A mounting hole, a fixture housing 52 and a power module 43 are arranged on the hanger bar A 5, and the heat sink 41 passes through a mounting hole in the hanger bar A 5 and is connected to the fixture housing 52.

The above are merely preferred embodiments of the present invention, and therefore, equivalent changes or modifications made according to the structures, features and principles described in the present invention shall fall into the scope defined by the claims of the present invention.

What is claimed is:

1. An optical assembly with a swing-adjustable lens, comprising:

a spherical cage base (1), a lens support (2), an optical lens (3), and an LED light source (4), wherein a spherical cage cavity (11) is formed in the spherical cage base (1), wherein the LED light source (4) is fixedly arranged in the spherical cage cavity (11), wherein the lens support (2) is provided with a hollow spherical head housing (21), wherein the optical lens (3) is arranged in an inner cavity of the spherical head housing (21), wherein a light outlet of the optical lens (3) is fixedly connected to the lens support (2), and wherein the spherical head housing (21) is rotatably arranged in the spherical cage cavity (11), so that the light inlet of the optical lens (3) and the LED light source (4) are arranged in a paired manner, wherein a limiting ring (22) is arranged in a lower opening of the lens support (2), wherein a skirt ring (31) is arranged at a light outlet of the optical lens (3), wherein a plurality of limiting fasteners (23) are arranged on a side wall of the lens support (2), and wherein the limiting fastener (23) interacts with the limiting ring (22) to fasten and connect the skirt ring (31).

2. The optical assembly with a swing-adjustable lens of claim 1, wherein the spherical cage base (1) comprises:

a hollow cage body (12) and a cage cover (13), wherein the cage body (12) is connected to the cage cover (13) in a paired manner, wherein the projection of an inner side wall of the cage body (12) and an inner side wall of the cage cover (13) on the vertical cross section form a minor arc, wherein the minor arc rotates around the vertical central axis of the spherical cage base (1) to form a spherical cage cavity (11), and wherein the spherical head housing (21) is rotatably arranged in the spherical cage cavity (11) between the cage body (12) and the cage cover (13).

3. The optical assembly with a swing-adjustable lens of claim 2, wherein the cage cover (13) is provided with a rotary snap ring (130), and wherein the rotary snap ring (130) is connected to the cage body (12) in an interacting manner to assemble the spherical head housing (21) in the spherical cage cavity (11).

4. The optical assembly with a swing-adjustable lens of claim 2, wherein a plurality of anti-sliding ribs (110) are arranged in the spherical cage cavity (11), wherein the plurality of anti-sliding ribs (110) are arranged on an inner side wall of the cage body (12) and an inner side wall of the cage cover (13) at equal intervals around the vertical central axis of the spherical cage base (1), and wherein the plurality of anti-sliding ribs (110) abut against an outer side wall of the spherical head housing (21).

5. The optical assembly with a swing-adjustable lens of claim 2, wherein the cage body (12) is provided with a base plate (14), and wherein the base plate (14) is provided with a plurality of insertion notches (140) and stop blocks (141) for interacting with the insertion notches (140).

6. The optical assembly with a swing-adjustable lens of claim 1, wherein a light-emitting central axis of the LED light source (4) overlaps a vertical central axis of the spherical cage base (1), and wherein a rotation center point A of the spherical head housing (21) is on the vertical central axis of the spherical cage base (1).

7. A lighting fixture, comprising:

a heat sink (41), the optical assembly with the swing-adjustable lens of claim 1, wherein an island unit (42) is arranged in the heat sink (41), wherein the spherical cage base (1) is fixedly arranged in the heat sink, wherein a lower end of the island unit (42) penetrates through the spherical cage base (1) and is arranged in the spherical cage cavity (11), wherein the LED light source (4) is fixed on a lower end surface of the island unit (42), wherein the heat sink (41) is provided with a power supply module (43), and wherein the power supply module (43) is connected to the LED light source (4) through wires, and wherein an inner side wall of the heat sink (41) is provided with a plurality of guide plates (410), wherein the guide plates (410) are provided with sliding fastening notches (411), and wherein a base plate (14) is arranged in the sliding fastening notches (411) in an inserting manner, thereby allowing the spherical cage base (1) to be fixed in the heat sink (41).

8. The lighting fixture of claim 7, further comprises:

a reflector (44), wherein the guide plate (410) is provided with a limiting notch (412), wherein an upper end of the reflector (44) is provided with a plurality of insertion pieces (45), and wherein the plurality of insertion pieces (45) are inserted into corresponding limiting notches (412), so that the reflector (44) is fixedly arranged in the lower opening of the heat sink (41).

* * * * *